Patented Nov. 29, 1949

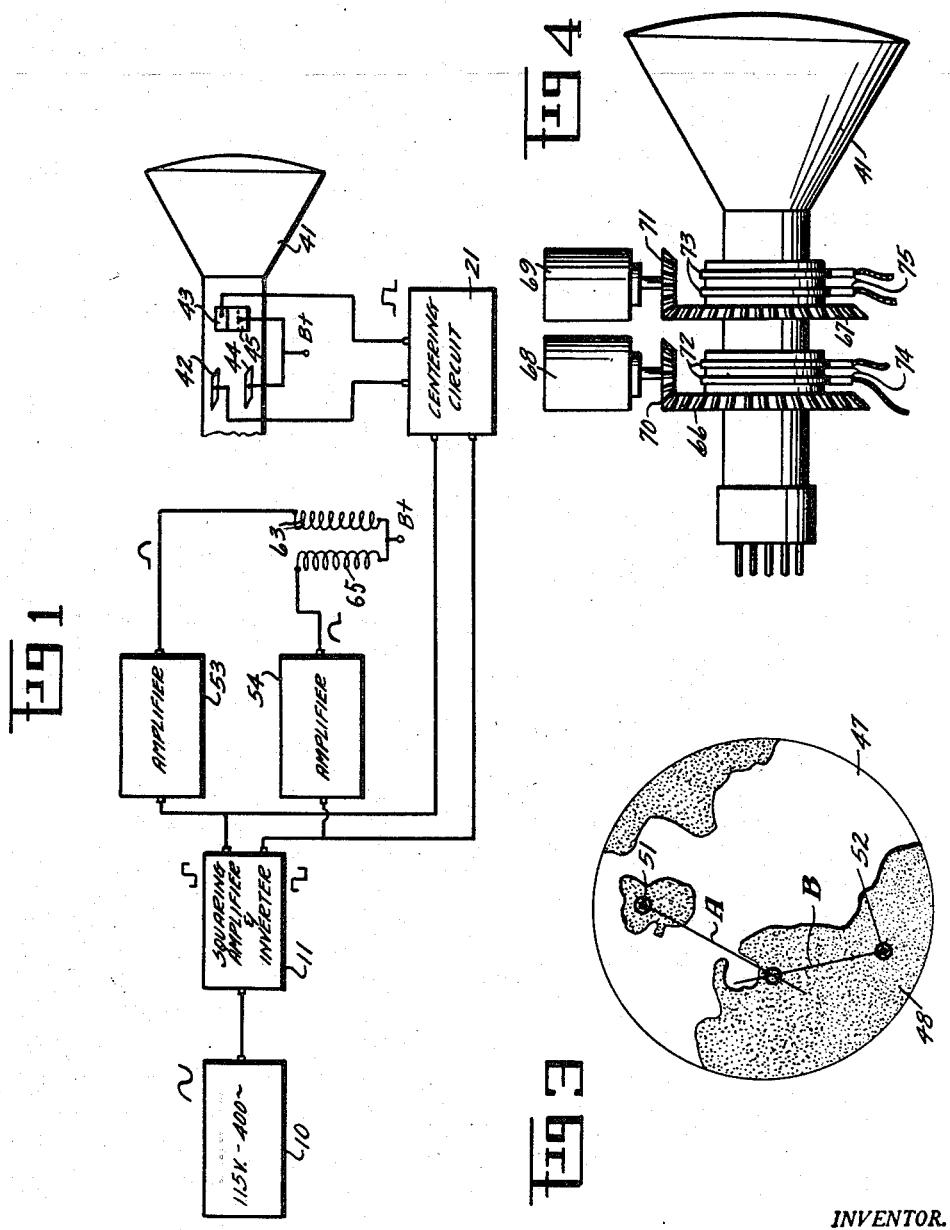

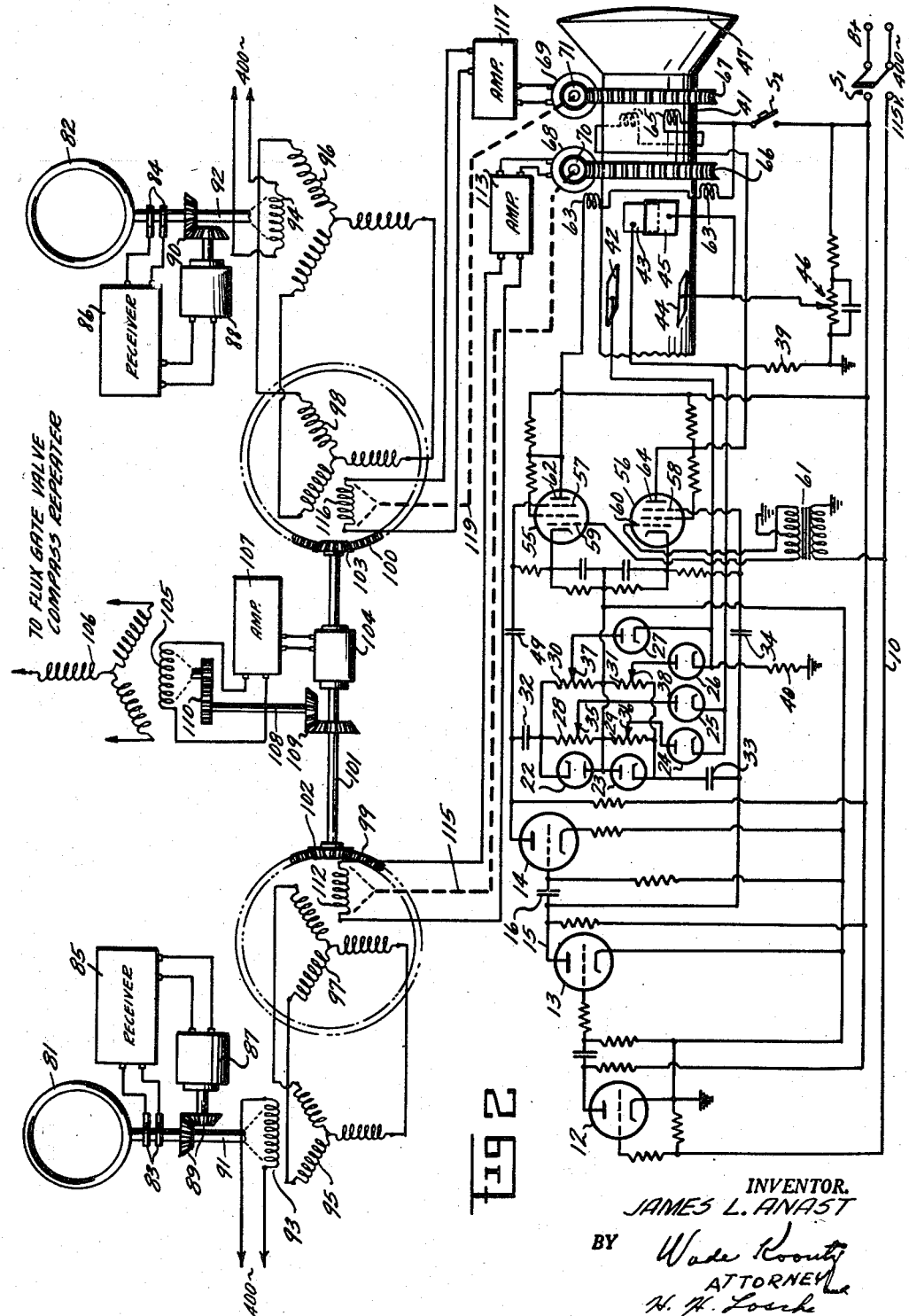

2,489,251

UNITED STATES PATENT OFFICE 2,489,251

RADIO GROUND POSITION INDICATING DEVICE

James L. Anast, Xenia, Ohio

Application November 19, 1947, Serial No. 786,941

12 Claims. (Cl. 343—112)

(Granted under the act of March 3, 1883, as amended April 30, 1928; 370 O. G. 757)

The invention described herein may be manufactured and used by or for the Government for governmental purposes without payment to me of any royalty thereon.

This invention relates to wireless ground position and course indicating apparatus for continuously indicating the position and course of a movable vehicle with respect to at least two known transmitting radio stations.

A number of wireless position and direction indicating devices are known which utilize a cathode ray tube for producing a visual pattern on a fluorescent screen from which the position of the indicating device relative to known radio transmitters can be determined. Where these devices are wholly electronic, the electronic equipment becomes burdensome; and where mechanical means have been used to overcome the objections of a cumbersome amount of electronic elements, there has entered the objectionable results of mechanical resistance and mechanical inertia.

The present invention contemplates simplifying wireless position and direction finding devices by utilizing only a sufficient amount of electronic elements to satisfactorily produce indicating traces on a cathode ray tube in accordance with signals picked up from two radio transmitters and by using in combination therewith mechanical means having a negligible amount of mechanical resistance or inertia losses to effect an efficient and accurate indicating result. These mechanical means consist of self synchronous transmitter-receivers used in cooperation with power motors to produce the mechanical motion required in the system. In this manner, the power motors can be positioned and mechanically connected to the elements to be operated to obtain the greatest efficiency. The errors of the self synchronous system are so small as to be negligible. The ground position indicating devices constructed of the elements in the manner, later to be more fully described, provides a simple, efficient, accurate and durable instrument that may be adapted for use in aircraft, ships, motor vehicles, etc., where it is impossible to determine ground position and direction by the natural senses.

The primary object of my invention is to provide a device for indicating the geographical position of the device with respect to one or more known geographical points.

Another object of this invention is to provide a cathode ray tube receiver indicator device for pictorially indicating the position of the indicator device with respect to radio transmitters.

A further object of this invention is to provide a mobile vehicle radio receiver means including a cathode ray tube for producing intersecting traces as a result of signals received from at least two radio transmitters to indicate the position of the mobile vehicle with respect to the radio transmitters.

It is still another object of my invention to provide a mobile vehicle position indicating receiver device in which the signals of at least two transmitters are received for effecting traces on the face of a cathode ray tube establishing the position of the transmitters and an intersecting point indicative of the mobile vehicle relative to the transmitters, the position indicating receiver device having self synchronous transmitter-receiver means cooperatively interconnecting rotatable loop antennas and a flux gate compass with sweep coils on the cathode ray tube to effect compensation of directional change of the mobile vehicle.

Other objects and advantages will become more apparent as the description proceeds and taken in conjunction with the accompanying drawings, in which:

Fig. 1 is a block diagram of the cathode ray tube circuit;

Fig. 2 is a circuit diagram of the combined cathode ray tube and sweep coil actuating receiver system with some elements shown in block for simplicity;

Fig. 3 is a view of the cathode ray tube face with a transparent map thereon and traces as may be expected upon operation of the tube; and Fig. 4 is a diagrammatical plan view of the cathode ray tube indicator unit.

Referring now to Figs. 1 and 2, there is shown a block 10 for supplying alternating current in which, for the purpose of illustration and convenience in obtaining currents from conventional alternators, is shown as a 115 volt, 400 cycle source. This current is supplied to a squaring amplifier and inverter means 11 which consists of two triode squaring amplifier tubes 12, 13 and an inverter tube 14. The output of the squaring amplifier means is connected to the inverter tube 14 which, as illustrated in Fig. 2, comprises coupling the plate of the squaring amplifier tube 13 by the conductor 15 through a capacitor 16 to the grid of the triode inverter tube 14. A centering circuit 21 which is connected to the squaring amplifier and inverter circuit 11, as shown in Fig. 2, consists of six diodes 22, 23, 24, 25, 26 and 27, and four potentiometers 28, 29, 30 and 31.

The plate circuit of the triode 14 is coupled to the cathode of the diode 22 and to one side of the potentiometers 28, 30 through the capacitor 32. The lead 15 from the squaring amplifier triode tube 13 is also coupled through the capacitor 33 to the cathode of the diode 23 and one side of the potentiometers 29, 31. The anode of the diodes 22, 23 and the other sides of the potentiometers are connected to ground. The action of the triode tube circuit 14 causes the anode plate voltage thereof to be 180 degrees out of phase with the voltage on the conductor 15 such that on one-half cycle of the input 400 cycle supply a positive potential is impressed on movable contacts 35, 37 of the potentiometers 28, 30 and on the other half cycle a positive potential is impressed on movable contacts 36, 38 of the potentiometers 29, 31.

A cathode ray tube 41 has deflecting plates 42, 43 which are connected to the centering circuit 21, the movable contacts 35, 36 being connected to the deflecting plate 43 through the respective isolating diodes 24, 25 while movable contacts 37, 38 are connected to the deflecting plate 42 through the isolating diodes 26, 27. The direct current circuits of diodes 24 and 25 and diodes 26 and 27 are completed through resistors 39 and 40 respectively. Deflecting plates 44, 45 are connected to the movable contact of a potentiometer 46 connected between B+ and ground for fixing the potential of these plates above ground. The portion of the cathode ray tube containing the electron gun has not been shown or described herein since its function is well known and is not material to the present invention. In the absence of any potential on the deflecting plates, the electron beam would strike the center of a fluorescent screen 47 of the cathode ray tube. By controlling potentiometers 28—31, the spot on the fluorescent screen 47 can be separated into two distinct spots, the position of one spot being controlled by the potentiometers 28, 30 and the position of the other spot being under the control of the potentiometers 29, 31. However, with the plates 44 and 45 at zero, or ground, potential the two spots could only be positioned in the first quadrant of the screen 47. But by adjusting the potentiometer 46, until the potential on plates 44 and 45 is approximately equal to one-half the maximum voltage applied to plates 42 and 43 from potentiometers 28—31, each of the two spots may be positioned in any quadrant of the screen. In other words, the spot can be pulled to one position at any place on the screen 47 for one-half cycle of the input voltage and another spot can be positioned at any place on the screen 47 for the other half cycle of the input voltage by adjusting the potential on plates 42 and 43 with the respective pairs of potentiometers 28, 30 and 29, 31.

Thus it may be seen that by controlling the movable contacts 35, 37 one spot, for example, as shown by 51 on the face of the cathode ray tube in Fig. 3, can be positioned at any place on the face; while by controlling the movable contacts 36, 38 the other spot, for example, as shown by 52 in Fig. 3, can be positioned at any place on the face. A transparent map, as shown by 48, may be placed on the face 47 of the cathode ray tube which may represent the earth in the vicinity where the device is to be operated and the two spots 51 and 52 may be adjusted to the positions of two known radio transmitter stations.

Referring again to Figs. 1 and 2, amplifier circuits 53 and 54 are shown as being connected through sweep coils 63 and 65, respectively, to B+ potential. The amplifier circuits include amplifier tubes 55 and 56 which have their cathodes connected to ground through biasing resistors. The suppressor grid 57 of tube 55 is connected to the plate of the inverter triode tube 14 through condenser 49, and the suppressor grid 58 of the tube 56 is connected to the plate of the squaring amplifier tube 13 through the condenser 34 wherein the conductivity of tubes 55 and 56 will be controlled by the grids 57 and 58 operating 180 degrees out of phase. The control grids 59 and 60 of the tubes 55 and 56 are connected respectively to the opposite ends of a secondary winding, which is center tapped to ground, of a transformer 61 coupling the control grids 59, 60 to the 115 volt, 400 cycle source such that these control grids have voltages impressed thereon 180 degrees out of phase. The anode 62 of the amplifier tube 55 is connected through a sweep coil 63 to B+ voltage, which sweep coil is constructed in two sections to produce a magnetic field across the cathode ray tube. The anode 64 of the amplifier tube 56 is connected to a sweep coil 65, also in two sections to produce a magnetic field across the cathode ray tube. In this manner, the grids 57 and 59 of the amplifier tube 55 are in phase with each other but 180 degrees out of phase with the grids 58 and 60, also in phase with each other, of the amplifier tube 56, and vice versa. Also, since the same 115 volt, 400 cycle source supplies the above described circuit, the frequency of the voltage impressed on the plates 42 to 45 is synchronized with the frequency of the voltage across the sweep coils 63, 65.

The sweep coils 63 and 65 are each supported on annular rings which are rotatably supported to encircle the cathode ray tube in any well known manner of constructing cathode ray tube sweep coils. Each annular ring includes a ring gear, as 66, 67, actuatable by a power motor, as 68, 69 respectively, by corresponding pinion gears 70, 71. A practical manner of making connections to the sweep coils is shown in Fig. 4 in which slip rings 72, 73 are mounted on the rotatable annular rings and in operative relation with corresponding brushes 74 and 75.

Referring now more particularly to Fig. 2, two loop antennas 81 and 82 are rotatively mounted on a mobile vehicle, as an airplane or ship, and have antenna slip ring and brush pick-off means 83, 84 respectively, connected to corresponding radio receivers 85, 86. The receivers each control a power motor 87, 88, respectively, that maintain the corresponding antenna in a minimum or null signal position through the corresponding gears 89, 90 shafts 91, 92. Insulatingly secured to each of the shafts 91 and 92 is a rotor coil 93, 94 of a synchro transmitter each of which is connected to an alternating current source, as for example 400 cycles. In flux relation with each of these transmitter rotor coils are synchro transmitter stator windings 95, 96 which are fixed with respect to the mobile vehicle. The above described device constitutes automatic radio compass means wherein in the usual practice the synchro transmitter stator windings are in circuit with stator windings of instrument synchro repeaters. In the present invention, however, synchro receiver stator windings 97 and 98 are connected in parallel circuit with the synchro transmitter stator windings 95 and 96, respectively. The synchro receiver stator windings 97 and 98 are rotatively mounted with respect to the mobile vehicle the mounting of each of which includes a ring gear as represented by the broken lines 99, 100, respectively. The two ring gears 99 and 100 are operatively connected to rotate simultaneously in the same direction by a shaft 101 having two similar pinion gears 102 and 103 on opposite ends thereof, the ring gear 99 engaging the pinion gear 102 tangential to the pinion gear radius (102) most removed while the ring gear 100 meshes with the pinion gear 103 tangent with the pinion gear radius (103) nearest the observer. The shaft 101 is driven by a reversible power motor 104 which may be a direct drive, gear drive, chain and sprocket drive, etc., as desirable, as long as the drive is positive and without lash. The power motor 104 is under the control of current induced in the rotor winding 105 of a flux gate valve compass repeater receiver. Only the stator windings 106 of the flux gate valve compass is shown since the construction and operation of the transmitter, in which the earth's magnetism is superimposed on a substantially high frequency multiphase field in the stator windings of the transmitter, are known but immaterial to a clear understanding of the present invention. Upon any change in the heading of the mobile vehicle, the resultant field in the flux gate receiver stator windings 106 will induce a current flow in the flux gate receiver rotor winding 105 which is amplified sufficiently by an amplifier 107 to cause rotation of the power motor 104 in a direction to maintain the stator windings 97 and 98 in a constant predetermined position with respect to magnetic north. The flux gate receiver rotor winding 105 is rotatably mounted with respect to the flux gate receiver stator winding 106 and is connected by a shaft and gearing 108, 109, 110 to the shaft 101 in order to effect a followup for the flux gate receiver rotor winding 105. This followup may be effected through a cable, chain and sprocket, or the like, where desirable.

Associated in flux relation with the synchro receiver stator winding 97 is a synchro receiver winding 112 which is connected through an amplifier 113 to the motor 68. The motor 68 has the pinion gear 70 thereon that meshes with the ring gear 66 to control sweep coil 63. A mechanical connection between the motor or ring gear and the synchro motor rotor winding 112 is effected in any desirable well known manner, as by gearing, cable, etc., as represented by the broken lines 115, to provide a follow-up for the rotor winding. In the same manner, the synchro receiver rotor winding 116 is connected through an amplifier 117 to the motor 69 which rotates the ring gear 67, and consequently the sweep coil 65, through the pinion gear 71, and a follow-up is effected mechanically to the rotor winding 116 as represented by the broken lines 119.

In operation, the pilot of the mobile vehicle places a transparent map of the area over which or through which he is about to navigate. For the purpose of illustration, let it be assumed that the device is in an aircraft unit and the map 48 is the area over which the pilot expects to fly. The radio transmitter positions are known as marked 51 and 52 on the map 48. The cathode ray tube circuit is turned on by switch S1 (the sweep coil circuit remaining off by the open switch S2) and the movable contacts 35—38 adjusted until the two spots occur at the points on the map marked 51 and 52. The two receivers 85 and 86, the sweep coils, and the flux gate valve compass are then turned on. The flux gate valve receiver will control the motor 104 to actuate synchro receiver stator windings 97 and 98 to a predetermined position with respect to magnetic north which will thereafter be maintained regardless of changes in direction of the aircraft. At the same time, receivers 85 and 86 are tuned to respective transmitters, as for example the receiver 85 is tuned to the transmitter 51 and the receiver 86 is tuned to the transmitter 52 which transmitters are operating at different frequencies. The signals received will be operative through the receiver-motor network of each receiver system to rotate the respective antenna to the minimum signal position. The synchro transmitter rotor windings 93 and 94 will produce a magnetic field in the synchro transmitter stator windings 95 and 96 which magnetic field is also produced in the synchro receiver rotor windings 112 and 116. The current flow in these rotor windings are amplified to operate power motors 68 and 69, the signal from the radio transmitter station 51 being operative to effect operation of the power motor 68 and the signal from the radio transmitter station 52 being operative to effect actuation of the power motor 69. These power motors will rotate the sweep coils 63 and 65, respectively, and also the synchro receiver windings 112 and 116, respectively, will be rotated with respect to their stator windings until a null signal position is reached.

Sweep coils 63 and 65, having alternating currents passing therethrough and these currents being 180 degrees out of phase and being synchronized, respectively, with the deflecting voltages on the corresponding deflecting plates, cause two distinct traces to be formed on the scope face as shown by A, B in Fig. 3, the intersection of which indicates the position of the mobile vehicle, as the aircraft given in the example.

Whenever the aircraft flies off of the map 48, this map may be replaced and the movable contacts 35—38 of the potentiometers 28—31 adjusted for two new known radio transmitter stations on the new map and the course of the aircraft watched on the scope face as before. It is only necessary to interrupt the circuit to the sweep coils to position the two spots on the two new known transmitter stations.

From the foregoing, it may be seen and understood that the position indicating device provides a very accurate means of determining the position and course of a mobile vehicle in that errors due to mechanical friction and mechanical inertia are reduced to a minimum. Although I have shown and described a specific embodiment of my invention, it will be apparent to those skilled in the art that various modifications and applications thereof, as well as changes in detail of construction, may be made without departing from the spirit and scope of my invention and I desire to be understood that this invention is not limited to any specific form or arrangement of parts or elements except as such limitations are specified in the claims.

I claim:

1. A radio ground position indicating device comprising a cathode ray tube having a circuit means for successively positioning the ray of said tube to a plurality of positions on the fluorescent screen of said cathode ray tube whereby a plurality of spots are formed on said screen indicative of radio transmitter positions, rotatable sweep coils corresponding in number to said spots encircling said cathode ray tube to transversely deflect said ray to produce a plurality of linear traces on said fluorescent screen, means for energizing each said sweep coil concurrently with the formation of a corresponding spot, and radio receiver means adapted to be tuned to the transmitters of said transmitter positions the outputs of which are connected to electro-mechanical transmission means to control said electro-mechanical transmission means in accordance with received signals, said electro-mechanical transmission means being mechanically related to said sweep coils to control the rotation of said sweep coils about said cathode ray tube for producing intersecting traces the origins of which are at the points indicative of radio transmitter positions and the intersection of which is the position of the indicating device with respect to the radio transmitter positions.

2. A radio ground position indicating device as set forth in claim 1 wherein a transparent map is detachably held over said fluorescent screen with the positions of said radio transmitters marked such that the spots are adjustably positioned at the marked positions of said radio transmitting stations.

3. A radio ground position indicating device as set forth in claim 2 wherein a compass means responsive to the earth's magnetism is included in the electro-mechanical transmission means to compensate for relative directional changes of said radio receiver means with respect to magnetic north.

4. A radio ground position indicating device comprising a pair of rotatable antenna and receiver means each adapted to be tuned to a separate frequency radio transmitter, a synchro transmitter mechanically connected to each rotatable antenna, a synchro receiver electrically connected to each of said synchro transmitters, a cathode ray tube and an associated circuit adapted to alternately position the ray to two adjustable positions whereby two adjustable spots are formed on said cathode ray tube screen, two sweep coils encircling the cathode ray tube for transversely deflecting said ray, means for energizing said sweep coils concurrently with the formation of each spot, means for transforming signals received in each said synchro receiver to mechanical motion to rotate one each of said sweep coils whereby a radio signal received in each radio receiver means is operative to position the corresponding sweep coil to cause intersecting traces to be shown on the cathode ray tube face indicating the position of the indicating device with respect to the radio transmitters producing the received radio signals.

5. A radio ground position indicating device comprising a cathode ray tube circuit adapted to alternately position the ray to adjustable positions whereby two adjustable spots are formed on a mapped fluorescent screen of a cathode ray tube, two rotatably adjustable sweep coils encircling said cathode ray tube energizable concurrently with the formation of each spot for transversely deflecting said spots to form two traces on said mapped fluorescent screen, power means for separately rotatably adjusting said sweep coils, and radio receiver means operative to control electro-mechanical power transmission means connected with each said power means to receive signals of different frequencies for actuating said sweep coils in accordance with the corresponding signals received by said receivers whereby one trace passes through the present position of the indicating device and the source of one of the signals and the other trace passes through the present position of the indicating device and the source of the other received signal.

6. A radio ground position indicating device as set forth in claim 5 wherein a compass means responsive to the earth's magnetism is in the electro-mechanical power transmission means connection between said radio receiver means and said power means to produce a common compensation of directional changes of both said radio receiver means with respect to magnetic north.

7. A radio position indicating device comprising a cathode ray tube circuit including a cathode ray tube having two pairs of deflecting plates therein and a fluorescent screen, means for generating two sets of deflecting voltages, means for alternately impressing said sets of deflecting voltages on said pairs of plates whereby the ray alternately assumes two positions on said screen, means for independently adjusting the deflecting voltages in said sets whereby the positions of the two spots on said screen formed by the ray may be adjusted to corresponding transmitter positions, two rotatably mounted sweep coils encircling said cathode ray tube corresponding to said two sets of deflecting voltages, means for energizing each of said sweep coils concurrently with the application of its corresponding set of deflecting voltages to said deflecting plates whereby traces are produced on said screen having origins at said spots, a pair of rotatable loop antennas each having receiver means constructed and arranged to maintain the corresponding loop antenna in a minimum signal position, said loop antennas each connected to a synchro transmitter means, and a synchro receiver means electrically connected to each of said transmitter means, each synchro receiver having a rotor winding in circuit with a power means for transforming electrical power into mechanical power, one each of said power means being mechanically connected to one each of said rotatably mounted sweep coils for imparting rotary motion thereto whereby tuning each of said two receiver means to two respective stations of different frequencies positions said traces on said fluorescent screen indicating the direction of each source of transmitted radio signal, the intersection of said traces being the position of said indicating device with respect to said stations.

8. A radio position indicating device as set forth in claim 7 wherein a transparent map indicating the positions of two known radio transmitters is removably held over the fluorescent screen of said cathode ray tube and said deflecting voltages of said deflecting plates adjusted to position said spots on said map at points indicative of said radio transmitters.

9. A radio position indicating device as set forth in claim 8 wherein a flux gate compass receiver means is in operative mechanical relation with said synchro receivers for maintaining said synchro receivers in a constant directional position with respect to magnetic north.

10. A radio ground position and course indicating device for mobile vehicles comprising an automatic radio compass including two radio receivers on a mobile vehicle each having synchro transmitter-receivers, stator windings in said synchro receivers mechanically connected to rotate together with respect to the mobile vehicle, a compass responsive to the earth's magnetism operative to rotate said synchro receiver stator windings proportional to changes in direction of said mobile vehicle with respect to magnetic north, a synchro receiver rotor winding rotatable with respect to each said synchro receiver stator winding and being in electrical circuit with a power motor, a cathode ray tube circuit including means for adjustably positioning two alternately appearing spots on a fluorescent screen of a cathode ray tube, two rotatable sweep coils encircling said cathode ray tube and alternately energizable in synchronism with said alternately appearing spots to magnetically influence said spots to form traces, one each of said power motors mechanically connected to each sweep coil, and a transparent map removably attached over the cathode ray tube fluorescent screen with marked radio transmitters whereby when said spots are positioned at the radio transmitter marks and the automatic radio compass placed in operation two intersecting traces will be produced on said cathode ray tube fluorescent screen which intersection indicates the position of the indicating device relative to the transmitters.

11. A radio ground position and course indicating device for mobile vehicles comprising two rotatable loop antennas each having a radio signal receiver of the type to transform a received signal into mechanical power to rotate said corresponding loop antenna to minimum signal position, each said loop antenna carrying an alternating current energizable synchro transmitter rotor winding that is in flux relation to a synchro transmitter stator winding in fixed relation with the mobile vehicle, each synchro transmitter stator winding being connected in parallel with a synchro receiver stator winding rotatably mounted with respect to the mobile vehicle, both said synchro receiver stator windings being mechanically connected to rotate in the same direction and at the same angle, a flux gate compass receiver a power motor constructed and arranged to rotate said synchro receiver stator windings proportional to the directional change of the mobile vehicle with respect to magnetic north, said power motor being under the control of said flux gate compass receiver, a synchro receiver rotor winding in flux relation with each of said synchro receiver stator windings and rotatable with respect thereto, the induced current in said synchro receiver rotor windings operative to actuate electrical power means, and a cathode ray tube circuit adaptable to adjustably produce two alternately appearing spots at desirable points on the fluorescent screen of said cathode ray tube and including two sweep coils encircling the tube which are energizable alternately in synchronism with said alternately appearing spots to effect two traces on said fluorescent screen, said electric power means of each said synchro receiver being operative to rotate one each of said sweep coils and the corresponding receiver rotor winding with respect to its synchro receiver stator windings to provide a follow up whereby the two traces, upon being adjusted to originate at points on said fluorescent screen illustrative of radio signal transmitters, will intersect indicating the position of the indicator device with respect to the radio signal transmitters.

12. A radio position and course indicating device as set forth in claim 11 wherein a transparent map is removably attached to said fluorescent screen marking the position of two radio signal transmitters from which signals are received and at which position said traces originate.

JAMES L. ANAST.

REFERENCES CITED

The following references are of record in the file of this patent:

UNITED STATES PATENTS

| Number | Name | Date |
|---|---|---|
| 2,183,634 | Zworykin | Dec. 19, 1939 |
| 2,284,812 | Gage | June 2, 1942 |
| 2,299,083 | Elm | Oct. 20, 1942 |